United States Patent [19]

Baer et al.

[11] 3,737,566

[45] June 5, 1973

[54] TELEVISION CODER AND DECODER

[75] Inventors: Ralph H. Baer, Manchester; William T. Rusch, Hollis, both of N.H.

[73] Assignee: Sanders Associates, Inc., Nashua, N.H.

[22] Filed: Dec. 8, 1970

[21] Appl. No.: 96,033

Related U.S. Application Data

[60] Continuation-in-part of Ser. No. 852,349, Aug. 22, 1969, abandoned, which is a division of Ser. No. 697,798, Jan. 15, 1968, abandoned.

[52] U.S. Cl. ..........................178/5.8 R, 178/DIG. 35

[51] Int. Cl. ..........................H04n 5/44

[58] Field of Search ..........................35/9 B, 9 C, 9 G, 35/9 H; 178/5.6; 340/324 A, 190; 250/217 CR

[56] References Cited

UNITED STATES PATENTS

| | | | |
|---|---|---|---|
| 2,540,144 | 2/1951 | Stern | 250/217 CR |
| 2,994,077 | 7/1961 | Terhune | 250/217 CR |
| 3,095,653 | 7/1963 | Corrigan | 35/9 B |

*Primary Examiner*—Richard Murray
*Attorney*—Louis Etlinger

[57] ABSTRACT

Apparatus is herein disclosed for use in conjunction with television receivers for presenting coded messages displayed on a television screen and for decoding same by the selection of a particular displayed coded symbol. The coder comprises means for flashing symbols on the television screen an odd or even number of times. The decoder comprises a multivibrator responsive to said coded symbol.

8 Claims, 4 Drawing Figures

*INVENTORS*

RALPH H. BAER
WILLIAM T. RUSCH

*BY* Richard I. Seligman

*ATTORNEY*

INVENTORS
RALPH H. BAER
WILLIAM T. RUSCH
By Richard J. Seligman
ATTORNEY

INVENTORS
RALPH H. BAER
WILLIAM T. RUSCH
By Richard A. Seligman
ATTORNEY

TELEVISION CODER AND DECODER

This is a continuation-in-part of Application Ser. No. 852,349, filed Aug. 22, 1969, now abandoned which is a division of Application Ser. No. 697,798, filed Jan. 15, 1968 now abandoned.

BACKGROUND OF THE INVENTION

Heretofore, color and monochrome television receivers have been used generally by the home and other viewers as a display means for programming originating at a studio with only visual communication with the displayed presentations.

SUMMARY OF THE INVENTION

Accordingly, it is an object of this invention to provide apparatus for further communicating with a television display by presenting coded messages thereon and by providing means for decoding same.

It is another object of the present invention to provide for interrogating a standard TV receiver through an optical photosensor in a manner allowing the identification of a suitably coded message, not interpretable by the unaided eye. Such message having been originated in the TV viewers' equipment by a cooperative commercial TV, closed-circuit TV or CATV station or by the TV viewer himself.

It is a further object of this invention to provide apparatus for generating coded symbols on the screen of a TV receiver.

It is yet another object of this invention to provide apparatus for even-odd flashing discernment of a symbol displayed on a television screen.

In accordance with one embodiment of the present invention apparatus is provided for displaying a coded presentation on a television screen and for decoding same. For example, test questions can be displayed on the TV screen with a multiple set of answers whereby the correct answer is coded in such a manner that a photocell circuit would detect the coding signifying selection of the correct answer.

BRIEF DESCRIPTION OF THE DRAWINGS

The aforementioned and other objects, features and advantages of the present invention will become more apparent from the following detailed description thereof when considered in conjunction with the drawings, wherein.

DESCRIPTION OF THE PREFERRED EMBODIMENT

Figure 1:
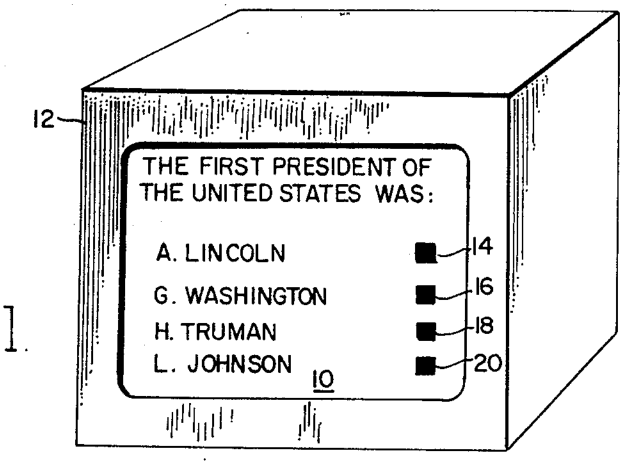
FIG. 1 is a sketch illustrating the TV screen of a receiver employed in a coded information mode.
Figure 2:
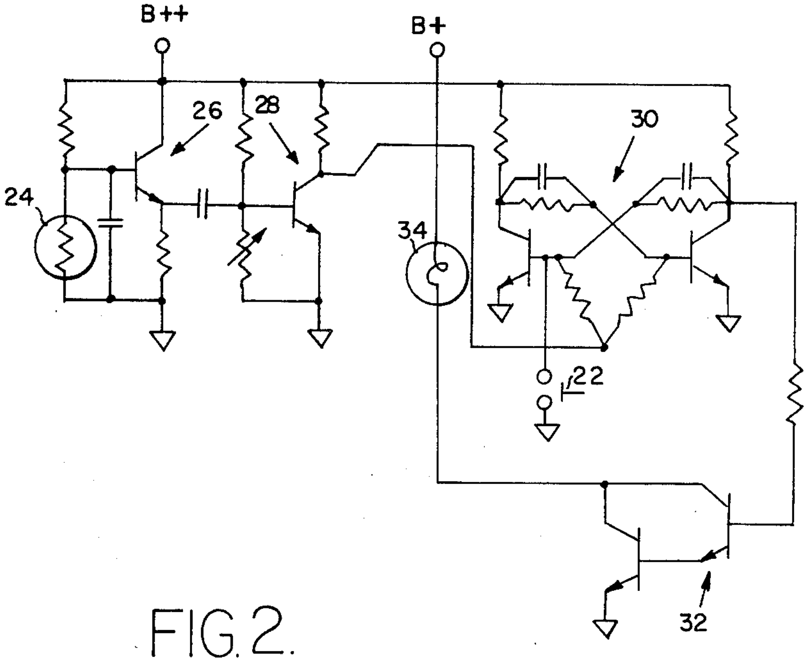
FIG. 2 is a schematic of a decoder used to decode the information present on the TV screen of FIG. 1.

Referring now to FIG. 2, there is illustrated thereby a decoding apparatus. The apparatus is described in connection with the sketch of FIG. 1.

Information is presented on a screen 10 of a television receiver 12 in such a manner that a portion thereof is coded. For example, FIG. 1 illustrates using the presentation for testing. The question and a group of possible answers are presented on TV screen 10 as illustrated with symbols 14–20 shown next to each answer.

Figure 3:
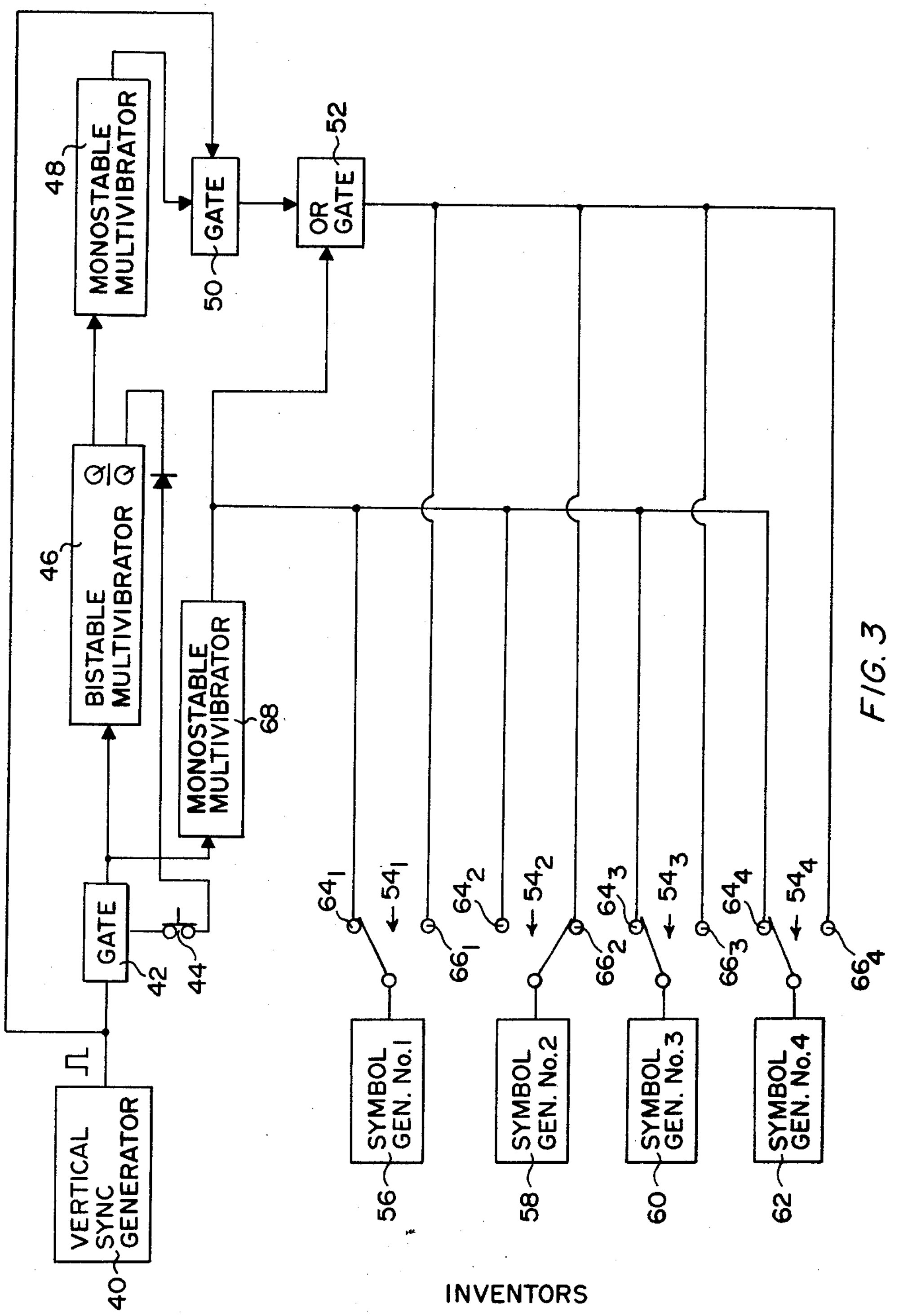
FIG. 3 is a block diagram of a system for presenting coded symbols on the screen of a TV receiver.
Figure 4:
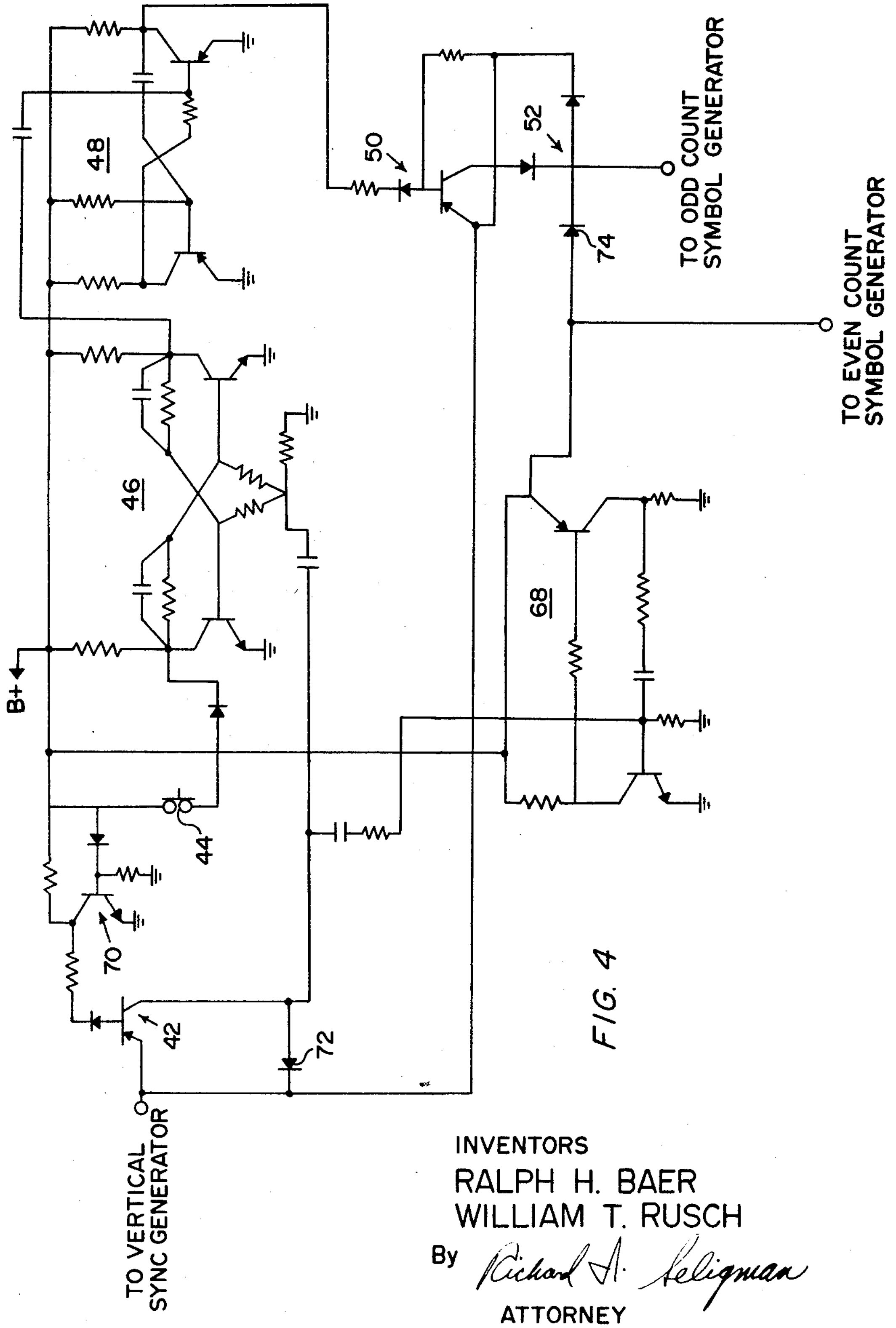
FIG. 4 is a schematic illustrating in greater detail the blocks of FIG. 3.

The question and answers are presented on the screen in conventional fashion as, for example, by broadcasting same. One of the symbols (in the example shown 16) is coded in such a manner that it will trigger the decoder of FIG. 2. For example, symbols 14, 18 and 20 are coded to flash an even number of times (for example 60) whereas the correct answer, symbol 16, will flash an odd number of times (for example 61). FIGS. 3 and 4, to be described hereinafter, illustrate an embodiment of a means for coding the symbols. The decoder of FIG. 2 is arranged to respond to the odd number of flashes.

The electronics of FIG. 2 can be inserted into a "gun" or other suitable configuration and therefore be easily handled.

Refer now to FIG. 2. Initially pressing a reset switch 22 sets the equipment. The user would be then instructed to select an answer by placing the decoder in juxtaposition to the corresponding symbol whereupon the "questioner" would cause the symbols to flash.

The modulation from the coded symbol incident at a photocell 24 is supplied via a buffer amplifier 26 and an amplifier and pulse shaper 28 to a flip-flop 30, which is triggered. The output from flip-flop 30 is applied via a buffer amplifier 32 to a lamp 34 which will light with a steady glow until reset indicating the correct answer was chosen.

If an incorrect answer was chosen, the lamp will flicker for a time equal to the time the symbol (14, 18, 20) is being modulated and then will go out.

To go to the next question, the decoder is returned to its starting position by operating reset switch 22. Note: initially reset switch had to be depressed so that the flip-flop would be in the proper state to provide a steady output to the lamp when photocell 24 receives an odd number of flashes.

Referring now to FIG. 3, there is illustrated in block diagram format apparatus for presenting coded symbols on the screen of a television receiver. The vertical sync generator and symbol generators are set forth in detail in said co-pending application, Ser. No. 697,798, filed Jan. 15, 1968, for Television Gaming and Training Apparatus, and assigned to the assignee of this application. The output of the symbol generators are coupled to the TV receiver in the manner set forth in said application, Ser. No. 697,798, to display symbols such as symbols 14 through 20 shown in FIG. 1.

The positive output pulses of a vertical sync generator 40, which provide pulses at the standard vertical scanning frequency used in commercial television receivers (60Hz) are applied to a gate 42. Gate 42 are enabled by opening a normally closed switch 44, which is coupled to the $\bar{Q}$ output of a bistable multivibrator 46. The pulses passing through enabled gate 42 cause bistable multivibrator 46 to switch states. The Q output from bistable multivibrator 46 is applied to trigger a monostable multivibrator 48, the output from which is applied as one input to a gate 50. Gate 50 has a second input thereto from the vertical sync generator 40. The output pulses from gate 50 are applied via an OR gate 52 to a number of switches $54_1$ through $54_4$.

There will be one switch for each symbol to be generated, and four are shown here only for illustrative purposes. The arms of switches 54 are connected to a number of symbol generators 56 through 62. The switch arms are connected to contacts 64 of the switches 54 if the symbols to be generated are to flash an even number of times, and are connected to the contacts 66 of the switches 54 if the symbols are to flash an odd number of times. Contacts 66 of the switches 54 are coupled to the output of OR gate 52. The output of gate 42 is coupled to a monostable multivibrator 68 to trigger same, with its output coupled to a second input to OR gate 52. The output of monostable multivibrator 68 is also coupled to the contacts 64 of switches 54, that is, to the contacts providing even flashing symbols.

In the embodiment illustrated in FIG. 1, symbol 16 flashes an odd number of times so in FIG. 3 only symbol generator number 2 is shown connected to contact 66.

The symbol generators also receive horizontal sync pulses in the manner set forth in the aforementioned application Ser. No. 697,798.

To cause even-odd flashing of the symbols generated by the generators 56 through 62, the circuit is enabled by operating switch 44, which is a normally closed switch. The switch is opened and gate 42 is enabled. The first subsequent pulse from the vertical generator is therefore applied via the gate 42 to trigger monostable multivibrator 68, whose output is applied to the contacts 64 of switches 54, which are connected to the symbol generators which are to flash an even number of times. The output pulse from monostable multivibrator 68 is also applied via OR gate 52 to the contact 66, which is coupled to those symbol generators which are to flash an odd number of times. Accordingly, after the gate 42 is enabled, the first pulse from the vertical generator will cause each of the symbols to flash on the screen. The first pulse from a vertical sync generator 40, after gate 42 is enabled, also triggers bistable multivibrator 46; however, monostable multivibrator 48 is not triggered since the Q output of the bistable multivibrator goes low and a positive pulse is required to trigger same.

The second pulse from the vertical generator, after gate 42 is enabled, as before, will be applied through the gate 42 to trigger the multivibrator 68 whose output is applied to generators 56–62, either directly or via the OR gate 52. The second pulse is also applied to bistable multivibrator 46 causing same to go high whereby the positive pulse from the Q output causes triggering of monostable multivibrator 48 and enabling of gate 50. Gate 50 is enabled for a time somewhat greater than the time between vertical pulses so that when a third pulse or other odd pulse is applied from the vertical generator, even after gate 42 has been disabled, although it does not pass through gate 42, it does pass through gate 50, through OR gate 52 and to the contact 66 of the switches 54, thereby providing the third or odd pulse to those symbol generators which are connected to this contact.

AccordinglY, we see that when the switch 44 is closed after being initially opened, one more odd vertical pulse will be applied to the symbol generators for providing an odd number of flashes for the symbols. If the next pulse from the vertical sync generator, after the switch has been closed, is an "even" pulse, the gate 42 will be enabled for that one more pulse because the $\overline{Q}$ output of the bistable multivibrator 46 will be high and keep gate 52 enabled for this one pulse.

One typical circuit for providing the blocks of FIG. 3 is illustrated in FIG. 4. A gate driver 70 is coupled to switch 44 to provide the proper signal for activating gate 42. Diodes 72 and 74 are steering diodes for pulling the point low after a pulse has passed.

As mentioned above, the invention may be employed in conjunction with a cooperative TV station such as commercial TV, closed-circuit TV or CATV (community antenna television). The embodiment described is used for decoding messages on a TV screen, such messages being the result of transmission from the cooperative station, as for example, testing with coded answer supplied. Other transmissions can be transmissions from organizations offering services to the equipped viewer where the services offered may be typically Consumer Products Buying Recommendations, Stock "Buy-Sell-Hold" recommendations and others involving the presentation of valuable information available to the viewer equipped in accordance with this invention.

The principles of the invention may also be applied in the areas of scientific, educational, clinical and other applications. Hence, it is to be understood that the embodiment shown is to be regarded as illustrative only, and that many variations and modifications may be made without departing from the principles of the invention herein disclosed and defined by the appended claims.

We claim:

1. Television apparatus, comprising:

a television receiver for receiving coded information from a television signal source which transmits a predetermined code comprising a series of signals correlated with the raster scan containing serially odd and even numbers of pulses with means at said receiver for utilizing said signals to display at least a first spot flashing an even number of times and a second spot flashing an odd number of times and means for decoding said displayed information.

2. Television apparatus as defined in claim 1, wherein said first spot flashes n times and said second spot flashes $n+1$ times.

3. Television apparatus as defined in claim 1, wherein said decoding means includes a single light sensitive detector.

4. Television apparatus as defined in claim 3, wherein said decoding means further includes a bistable device coupled to said light sensitive detector.

5. Television apparatus as defined in claim 4, wherein said decoding means further includes means for initially setting said bistable device to a first state.

6. Television apparatus as defined in claim 5, wherein said decoding means further includes means responsive to the number of flashes of said flashing spots.

7. Television apparatus as defined in claim 6, wherein said means responsive includes means responsive to the state of said bistable device.

8. Television apparatus as defined in claim 1, wherein said decoding means includes only one light sensitive detector.

* * * * *

PO-1050
(5/69)

UNITED STATES PATENT OFFICE
CERTIFICATE OF CORRECTION

Patent No. 3,737,566 Dated June 5, 1973

Inventor(s) Ralph H. Baer and William T. Rusch

It is certified that error appears in the above-identified patent and that said Letters Patent are hereby corrected as shown below:

Column 4 Line 1 change "52" to --42--.

Signed and sealed this 25th day of December 1973.

(SEAL)
Attest:

EDWARD M.FLETCHER,JR.
Attesting Officer

RENE D. TEGTMEYER
Acting Commissioner of Patents